US006025776A

United States Patent [19]
Matsuura

[11] Patent Number: 6,025,776
[45] Date of Patent: Feb. 15, 2000

[54] VEHICLE INFORMATION COMMUNICATION SYSTEM AND METHOD HAVING RADIO TRANSMISSION CHECKING FUNCTION

[75] Inventor: Yuuichirou Matsuura, Kariya, Japan

[73] Assignee: Denso Corporation, Kariya, Japan

[21] Appl. No.: 09/218,078

[22] Filed: Dec. 22, 1998

[30] Foreign Application Priority Data

Mar. 9, 1998 [JP] Japan ................................ 10-056930

[51] Int. Cl.[7] ................................................ B60Q 1/00

[52] U.S. Cl. ......................... 340/438; 340/439; 340/539; 340/825.32; 701/29; 701/33

[58] Field of Search .................................... 340/438, 439, 340/539, 825.31, 825.32, 825.3; 701/29, 32, 33

[56] References Cited

U.S. PATENT DOCUMENTS

| | | | |
|---|---|---|---|
| 5,325,082 | 6/1994 | Rodriguez | 340/438 |
| 5,760,700 | 6/1998 | Ellis | 340/825.3 |
| 5,767,784 | 6/1998 | Khamharn | 340/825.31 |
| 5,781,125 | 7/1998 | Godau et al. | 340/870.01 |
| 5,940,007 | 8/1999 | Brinkmeyer et al. | 340/825.69 |
| 5,963,141 | 10/1999 | Takamatsu | 340/825.31 |
| 5,969,597 | 10/1999 | Weigl et al. | 340/426 |

FOREIGN PATENT DOCUMENTS 5-332888 of 0000 Japan .

*Primary Examiner*—Daryl Pope
*Attorney, Agent, or Firm*—Nixon & Vanderhye P.C.

[57] ABSTRACT

A vehicle is equipped with an engine ECU as a vehicle control unit and a transponder unit, which are connected through a communication line. The engine ECU sends out a response data such as a failure self-diagnosis information of the vehicle to the transponder unit through the communication line in response to a request transmitted through a radio wave communication from an external control station. The transponder unit transmits the response data through the radio wave communication to the control station in return to the request. The engine ECU has a circuit which receives the response data through radio wave communication. The engine ECU compares the received response data with the original response data sent out through the communication line. If the two response data agree, it is determined that the response data is transmitted to the control station successfully. However, if the two response data differ from each other, it is determined that there occurred a transmission failure.

10 Claims, 4 Drawing Sheets

VEHICLE INFORMATION COMMUNICATION SYSTEM AND METHOD HAVING RADIO TRANSMISSION CHECKING FUNCTION

CROSS REFERENCE TO RELATED APPLICATION

This application relates to and incorporates herein by reference Japanese Patent Application No. 10-56930 filed on Mar. 9, 1998.

BACKGROUND OF THE INVENTION

1. Field of the Invention

The present invention relates to a vehicle communication system and method, more particularly to a vehicle failure self-diagnosis information communication system and method, which communicate with an external control station through radio wave transmission.

2. Related Art

It is proposed recently to install a radio wave transponder unit having its antenna in a vehicle so that the transponder unit transmits vehicle failure self-diagnosis information from the vehicle to an external control station through a wireless communication. The control station may issue a vehicle repair request to a user of the vehicle in response to receiving the failure self-diagnosis information.

In this system, the transponder receives a data transmission request in one data format from the control station. Received data of the data transmission request is converted into another format specified in compliance with a communication protocol, and sent to an electronic control unit (ECU) in the vehicle, e.g., engine control ECU. The ECU in turn sends out the failure self-diagnosis information to the transponder unit, so that the failure self-diagnosis information is transmitted to the control station after data format conversion.

The ECU and the transponder unit communicate each other through a communication line in the vehicle, while the transponder unit communicates with the control center through radio waves. Therefore, the ECU is not able to check if the failure self-diagnosis information is duly received at the control center. Thus, it may occur that an ECU operating properly is replaced erroneously. Further, it may also occur that the failure self-diagnosis information is not transmitted to the control station properly if the transponder unit is reconstructed differently.

SUMMARY OF THE INVENTION

It is therefore an object of the present invention to provide a vehicle information communication system and method, which ensure checking of transmission of vehicle failure self-diagnosis information from a vehicle to an external control station.

According to the present invention, a vehicle is provided with a transponder unit having a radio wave input/output circuit, which transmits a radio wave signal indicative of vehicle information such as a vehicle failure self-diagnosis result to an external control station outside of the vehicle through radio wave communication. The vehicle is further provided with a radio wave receiver to receive the transmitted radio wave signal. Communication failure is checked in the vehicle by comparing the transmitted vehicle information with the received vehicle information.

BRIEF DESCRIPTION OF THE DRAWINGS

Other objects, features and advantages of the present invention will become more apparent from the following detailed description made with reference to the accompanying drawings. In the accompanying drawings.

DETAILED DESCRIPTION OF THE PREFERRED EMBODIMENT

Figure 1:
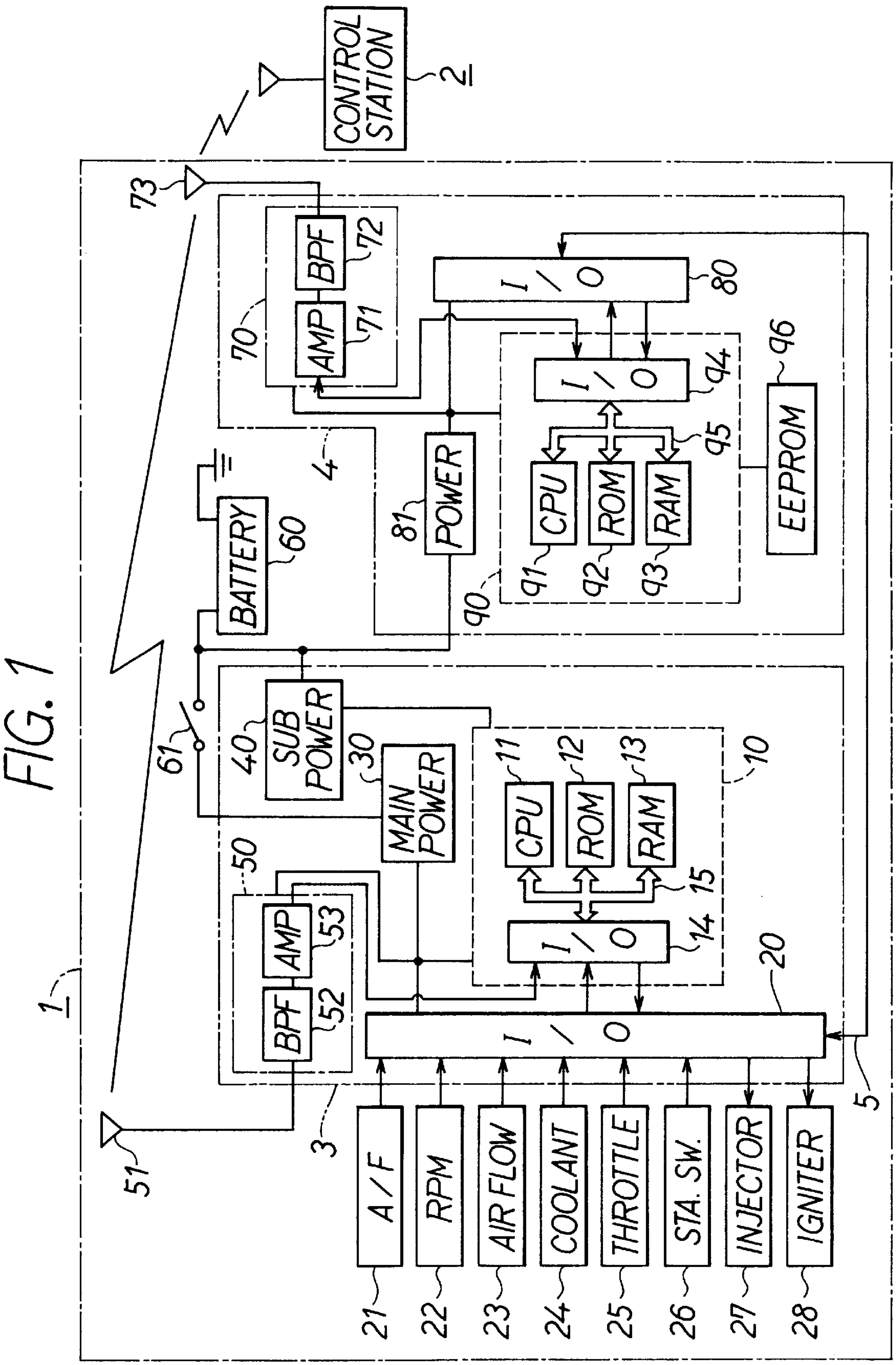
FIG. 1 is a block diagram showing a vehicle information communication system according to an embodiment of the present invention.

Referring first to FIG. 1, a vehicle 1 is equipped with an electronic control unit (ECU) 3 for controlling a vehicle engine (E/G). The ECU 3 includes generally a microcomputer (computer) 10, input/output circuit (I/O) 20 connected with various sensors and actuators, main power circuit 30, sub power circuit 40, and radio wave signal input circuit 50 which functions as a radio receiver unit.

The computer 10 comprises, as known in the art, a central processing circuit (CPU) 11, ROM 12 storing a control program for the CPU 11, RAM 13 for storing various data, I/O circuit 14, and bus 15 connecting those circuits. Thus, the computer 10 is constructed as a logic arithmetic circuit. Various sensors and actuators are connected to the computer 10 through the I/O circuit 20 for controlling the engine. The sensors include, for instance, an air-fuel ratio (A/F) sensor 21, rotation speed (RPM) sensor 22, air flow meter 23, coolant temperature sensor 24, throttle angle sensor 25, and starter switch 26. The actuators include, for instance, injectors 27 and igniter 28.

The computer 10, input/output circuit 20 and radio signal input circuit 50 are connected to a battery 60 through an ignition switch 61 and the main power circuit 30. Those circuits are supplied with electric power from the battery 60 when the ignition switch 61 is held turned on. Further, the computer 10 is connected to the battery 60 through the sub power circuit 40, which bypass the ignition switch 61. Thus, the computer 10 is kept supplied with electric power through the sub power circuit 40, so that various data in the RAM 13 of the computer 10 may be kept stored irrespective of turning on and off of the ignition switch 61.

The vehicle 1 is further equipped with a radio wave transponder unit 4, which transmits various information of the vehicle 1 through a wireless (radio wave) communication upon receipt of a request or inquiry from an external control station 2 outside of the vehicle. The transponder unit 4, which is located away from the ECU 3 within the vehicle 1, is connected to the engine ECU 3 through a communication line 5. The transponder unit 4 generally includes a radio wave signal input/output circuit 70, I/O circuit 80, power circuit 81 and microcomputer (computer) 90. The power circuit 81 is connected directly to the battery 60 to supply electric power to other circuits 70, 80 and 90.

The computer 90 comprises a CPU 91, ROM 92 storing a control program for the CPU 91, RAM 93 for storing various data, I/O circuit 94, and bus 95 connecting those circuits. Thus, the computer 90 is constructed as a logic arithmetic circuit. An electrically erasable programmable ROM (EEPROM) 96, a non-volatile memory, is connected to the computer 90. The EEPROM 96 stores therein a vehicle code such as type, model and frame numbers specific to each vehicle. This vehicle code is provided so that it is transmitted to the control station 2 together with vehicle information (self-diagnosis information) and is used by the control station to specify a vehicle which needs repair in response to the received self-diagnosis information.

The radio signal input/output circuit 70 in the transponder unit 4 comprises an amplifier 71 and band pass filter 72, so that it communicates with the control station 2 through an antenna 73. The radio signal input circuit 50 in the engine ECU 3 comprises an amplifier 53 and band pass filter 52 so that it receives through an antenna 51 a radio wave signal transmitted from the transponder unit 4 to the control station 2. Thus, the engine ECU 3 is enabled to receive, from the transponder unit 4 through radio wave communication, its vehicle information transmitted to the transponder unit 4 through the communication line 5. The antenna 51 for the radio signal input circuit 50 is required to receive only the radio signal generated within the vehicle 1. Therefore, the antenna 51 may be a simple type which may be printed on a printed circuit board of the ECU 3 or may be constructed as a pin.

Figure 2:
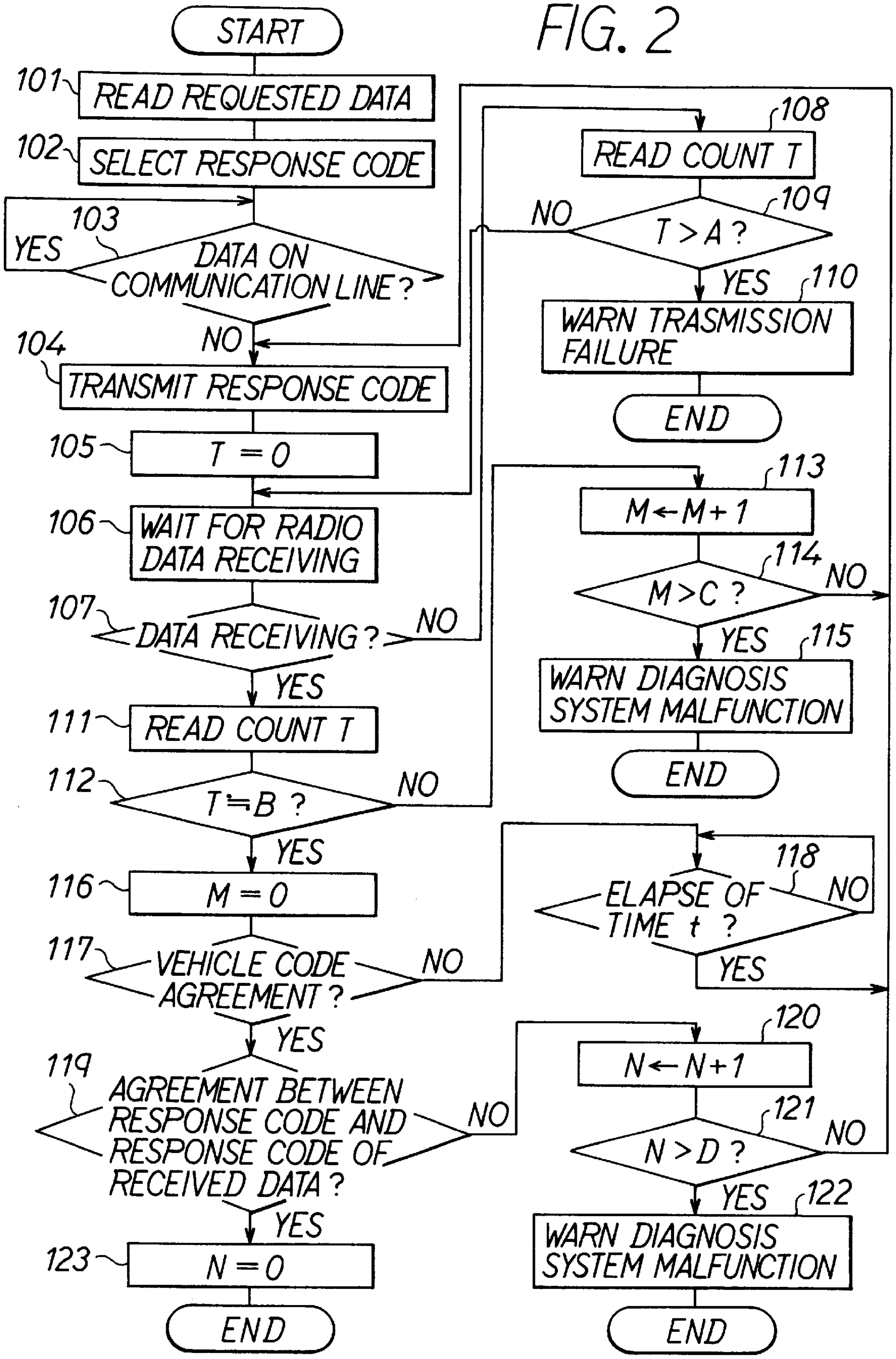
FIG. 2 is a flow diagram showing a checking communication failure processing executed in the embodiment.

The computer 10 in the engine ECU 3 is programmed to control the engine and self-diagnose a vehicle failure, e.g., failure of the sensors 21–26 and actuators 27, 28, as known well in the art. In addition, the computer 10 is further programmed to check communication condition between the transponder unit 4 and the control station 2. The computer 10, more specifically CPU 11, executes a processing for checking communication failure as shown in FIG. 2.

The computer 10 first reads in at step 101 a transmission request data transmitted from the control station 2. As described later with reference to FIG. 5, the transmission request data is received by the transponder unit 4 and then sent to the engine ECU 3 through the communication line 5. At step 102 in FIG. 2, the computer 10 selects a response code which corresponds to the request data and may be a vehicle information such as the vehicle failure self-diagnosis result. The computer 10 then moves to step 104 after checking at step 103 that there is no existing data on the communication line 5. At step 104, the response code selected at step 102 is sent to the transponder unit 4 through the communication line 5. At step 105, an internal timer counter is cleared (counted time period T=0) and starts counting time. The computer 10 then moves to step 106 to wait for receiving at the antenna 51 and the input circuit 50 a radio signal, which is to be transmitted from the transponder unit 4 to the control station 2 in response to the response code sent to the transponder unit 4 at step 104.

At step 107, the computer 10 checks if the radio signal transmitted from the transponder unit 4 is received at the antenna 51 and input circuit 50. If it is not received (NO), the computer processing move s to step 108 to read in the counted time period T. At next step 109, the counted time period T is compared with a reference time period A. This reference time period A is set for detecting a transmission failure. More specifically, the time period A starts from the issuance of the response code from the engine ECU 10 to the transponder unit 4 at step 104 and is set comparatively long to determined that there exists a certain transmission failure in the transponder unit 4, e.g., input/output circuit 70 or antenna 73, if the radio signal is not received by the input circuit 50 in the engine ECU 3 after the elapse of the reference time period A.

As long as the counted time period T is less than the reference time period A (NO in step 109), the computer processing returns to step 106 and repeats the sequence of steps 106–109. If the counted time period T exceeds the reference time period A (YES in step 109), the computer 10 issues a warning of transmission failure from the transponder unit 4. The warning may be a buzzing or lighting.

Figure 3:
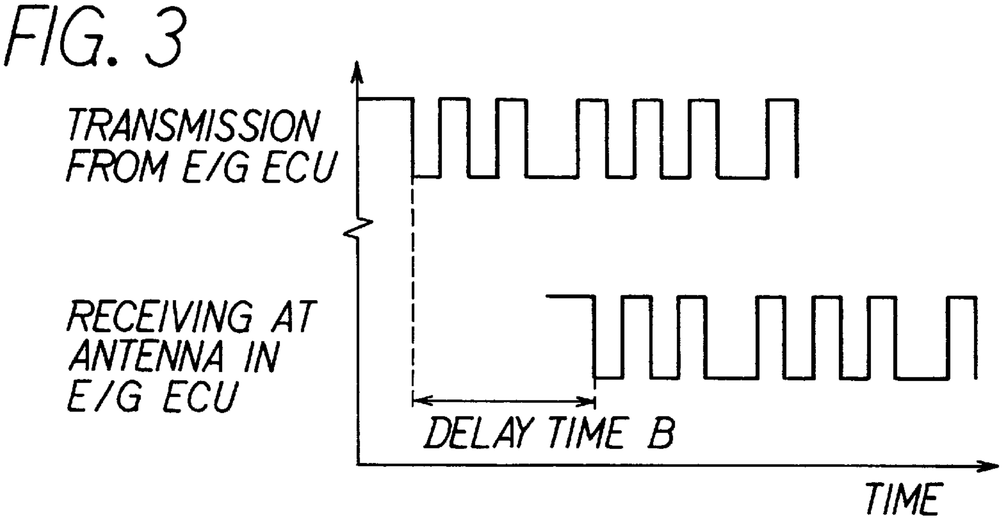
FIG. 3 is a timing diagram showing operation of the embodiment.

If the radio signal is received at the input circuit 50 in the engine ECU 3 (YES at step 107), on the other hand, the computer processing move s to step 111 to read in the counted time period T and to step 112 to compare it with a reference delay period B. This delay period B is set, as shown in FIG. 3, as a sum of delay time periods required for the response code to be sent from the engine ECU 3 to the transponder unit 4 through the communication line 5, to be converted into a format for radio wave signal transmission, to be transmitted externally through the input/output circuit 70 and antenna 70, to be transmitted to the antenna 51 and input circuit 50 in the engine ECU 3, to be converted into the original data format by the computer 10 for comparison with the original response code. Thus, the reference delay period B is set to vary from vehicle to vehicle.

If the counted time period T differs from the reference delay period B (NO in step 112), the computer 10 increments the counted number (M) of radio signal transmissions to M+1. At step 114, the counted number M is compared with a reference number C. If the counted number M is less than the reference number C (NO in step 114), the processing returns to step 104. If it exceeds the reference number C (YES), i.e., the counted time period T does not become substantially equal to the reference delay period B even when the radio signal has been transmitted repeatedly more than the reference number of times C, the computer 10 issues a warning at step 115. It is to be noted that this warning indicates a possibility of inappropriate change to the original self-diagnosis system, while the reference delay period B is set specifically to each vehicle.

If the counted time period T becomes substantially equal to the reference delay period B (YES in step 112), the counted number M is cleared (M=0). The computer 10 then checks if the vehicle code stored in the EEPROM 96 of the transponder unit 4 and included in the received radio signal agrees to the original vehicle code. If the codes do not agree to each other (NO), it is likely that the data transmission occurred at the same time as that of another neighboring vehicle by chance. In this instance, the computer 10 waits for an elapse of a predetermined time period "t" at step 118 and starts the transmission again at step 104 to repeat the above processing.

If the vehicle codes agree (YES at step 119), the computer checks further whether the response code received at the input circuit 50 agrees to the response code sent out to the transponder unit 4 for transmission to the control center 2. If the response codes 119 do not agree (NO), the computer 10 increments the counted number N of the transmission counter to N+1 at step 120 and compare the counted number N with a reference number D. If the counted number N is less than the reference number D (NO), the computer processing returns to step 104 to repeat the above steps until the response codes is determined in agreement at step 119.

If the counted number N reaches the reference number D (YES), i.e., the response codes do not agree for more than the reference number of times D, the computer 10 issues a warning of self-diagnosis system malfunction by lighting, buzzing or stopping engine operation at step 122. This system malfunction, disagreement between the response codes although those should be the same, may be caused by erroneous reconstruction. If the transmitted code and the received code agree (YES in step 119), the computer 10 clears the counted number N as determining that the self-diagnosis system operates normally.

It is to be noted in this embodiment that step 117 for checking vehicle codes may be executed before execution of step 112 for checking the transmission time period T.

Figure 4:
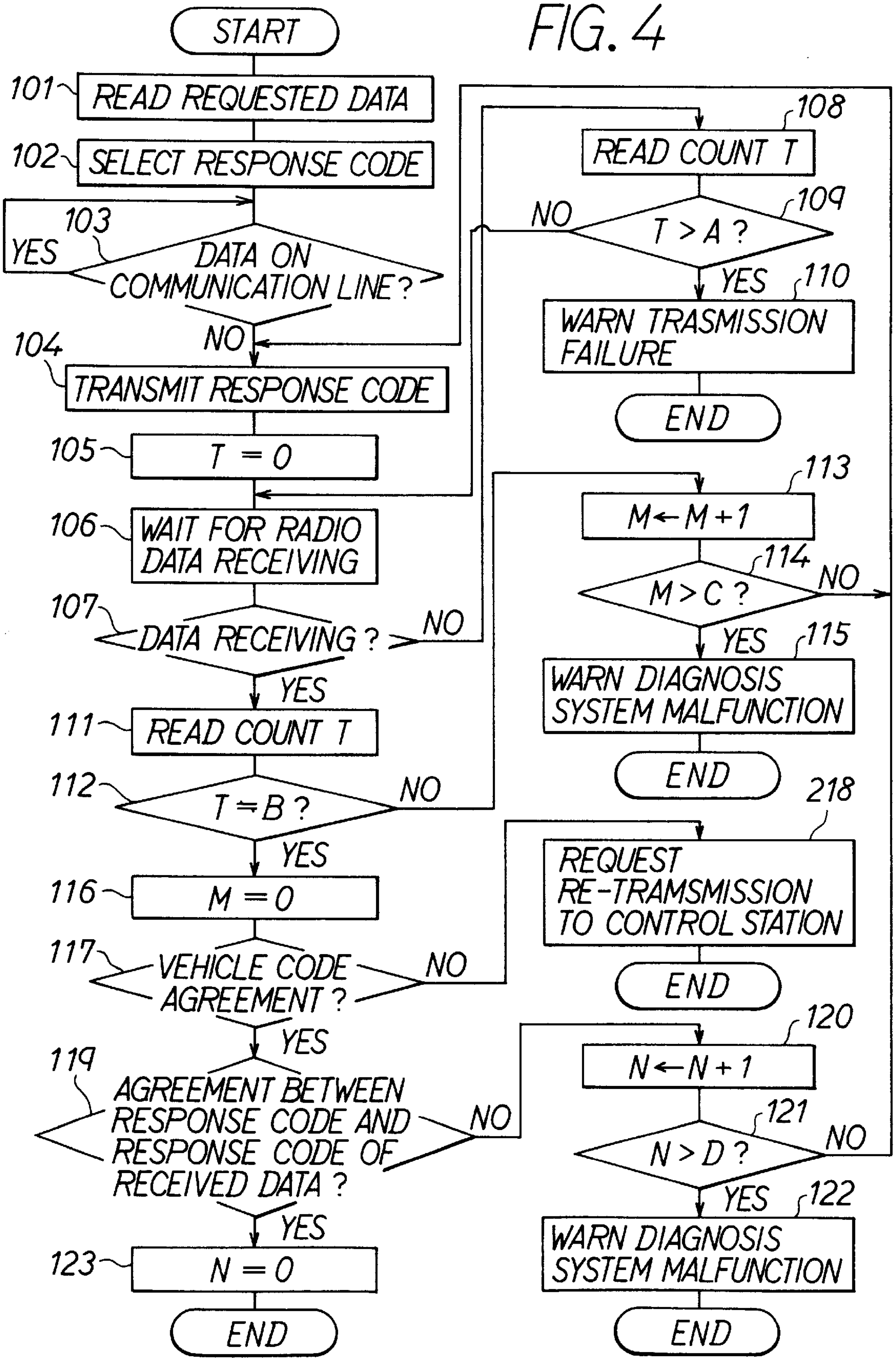
FIG. 4 is a flow diagram showing a modification of the communication failure checking processing shown in FIG. 2.

Further the above embodiment may be modified as shown in FIG. 4. In this modification, only step 218 is different from the processing shown in FIG. 2, so that the radio signal transmission from the transponder unit 4 is avoided to occur at the same time as that of another neighboring vehicle. That is, at step 218, the computer 10 only requests to the control station re-transmission of the request code. Thus, repetition of response code transmission from the vehicle 1 is avoided, thereby reducing arithmetic operation load on the CPUs 11 and 91.

Figure 5:
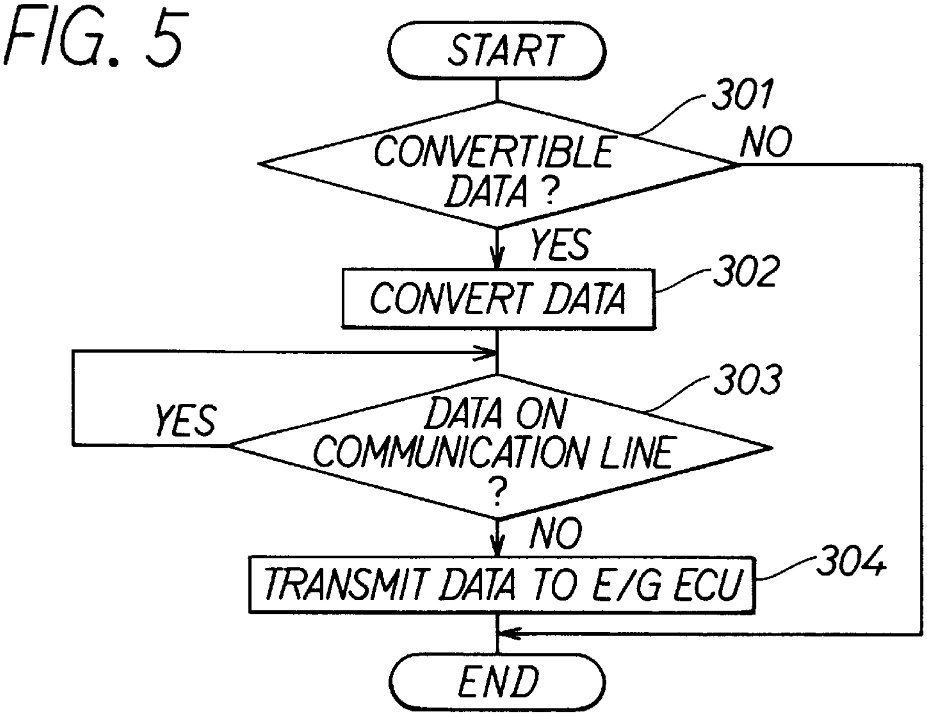
FIG. 5 is a flow diagram showing a data receiving processing executed in the embodiment.

The computer 90 of the transponder unit 4, specifically the CPU 91, is programmed to execute a request data receiving processing as shown in FIG. 5. This processing is initiated upon receiving the request data transmitted from the control station 2. The computer 90 first determines at step 301 if the received request data is convertible to a data format for communication between the transponder unit 4 and the engine ECU 3 based on the communication protocol. If it is not convertible (NO), the computer 90 ends this processing. If it is convertible (YES), however, the computer processing moves to step 302 to convert the format of the received request data into another data format for communication with the engine ECU 3. After checking at step 303 that any data is not on the communication line 5 (NO), the computer 90 sends out the converted request data to the engine ECU 3 through the communication line 5 at step 304. If there exists any data under transmission on the communication line 5 (YES in step 303), the computer 90 repeats step 303 until no data remains on the communication line 5.

Figure 6:
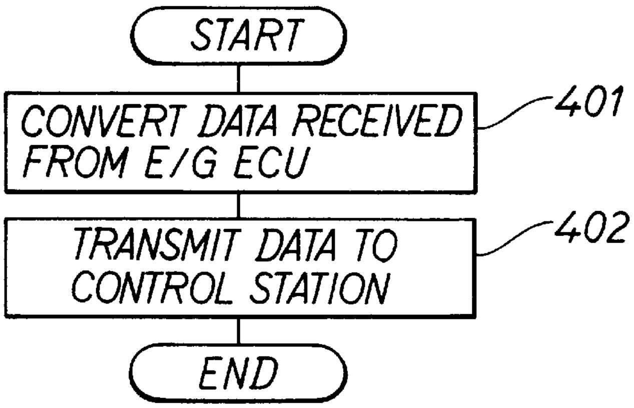
FIG. 6 is a flow diagram showing a data transmission processing executed in the embodiment.

Further, the computer 90 of the transponder unit 4, specifically the CPU 91, is programmed to execute a response data transmission processing as shown in FIG. 6. This processing is initiated upon receipt of the response data sent out from the engine ECU 3 as a response to the transmission request data from the computer 90. At step 401, the computer 90 converts the data format of the response data into the data format, which is required for radio wave transmission. Then at step 402, the computer 90 transmits the converted response data together with the vehicle code stored in the EEPROM 96 to the control station 2 through the input/output circuit 70 and antenna 73. It is to be noted that the engine ECU 3 receives this converted response data including the vehicle code, so that the engine ECU 3 executes the communication failure processing shown in FIG. 2 or FIG. 4.

Although the self-diagnosis result is communicated as the vehicle information between the control station and the vehicle in the above embodiment, the vehicle information may be other types such as a location of the vehicle, and/or the vehicle information may be communicated with another vehicle in place of the control station.

Further, the present invention is not limited to the disclosed embodiment and its modifications, but may be implemented in many other ways without departing form the spirit of the invention.

I claim:

1. A vehicle communication system for a vehicle in radio communication with an external station, the system comprising:

self-diagnosis means for detecting failure self-diagnosis information in the vehicle through a self-diagnosing operation thereof;

radio communication means for transmitting the failure self-diagnosis information to the external station through a radio signal;

radio receiver means for receiving the radio signal of the failure self-diagnosis information transmitted to the external station; and checking means for checking a system operation malfunction by comparing in the vehicle the failure self-diagnosis information of both the transmitted radio signal and the received radio signal.

2. A vehicle communication system of claim 1, wherein:

the checking means determines the malfunction when a timing of receiving the radio signal by the radio receiver means is later by more than a predetermined time period than a timing of transmitting the radio signal by the radio communication means.

3. A vehicle communication system of claim 1, wherein:

the self-diagnosis means, the radio communication means, the radio receiver means and the checking means are provided within the vehicle; and the self-diagnosis means and the radio communication means are connected through a communication line.

4. A vehicle communication system of claim 3, wherein:

the radio communication means sends out an information request to the self-diagnosis means through the communication line upon receipt of a radio signal of a transmission request from the external station; and the self-diagnosis means sends out the failure self-diagnosis information to the radio communication means in response to the information request through the communication line.

5. A vehicle communication system of claim 3, wherein:

the radio communication means has an antenna for the radio communication with the external station; and the radio receiver means has an antenna smaller than that of the radio communication means.

6. A vehicle communication method for a vehicle having a control unit, a transponder unit and a receiver unit therein, the method comprising the steps of:

sending out vehicle information from the control unit to the transponder unit through a communication line;

transmitting, from the transponder unit to an external radio communication site outside of the vehicle, a radio signal including the vehicle information received from the control unit through the communication line;

receiving the transmitted radio signal by the receiver unit; and checking, by the control unit, a transmission operation of the transponder unit by comparing information included in both the transmitted radio signal and the received radio signal, respectively.

7. A vehicle communication method of claim 6, further comprising the steps of:

receiving, by the transponder unit, a radio signal including a vehicle information transmission request transmitted from the external radio communication site; and sending out the vehicle information transmission request from the transponder unit to the control unit through the communication line, so that the control unit responsively sends out the vehicle information.

8. A vehicle communication method of claim 7, wherein:

the transmitting step transmits the radio signal by including a code specific to each vehicle in addition to the vehicle information.

9. A vehicle communication method of claim 7, wherein:

the vehicle information is a result of a vehicle failure self-diagnosis which the control unit executes.

10. A vehicle communication method of claim 7, wherein:

the checking step further compares, with a reference time period which is measured as the time, a time period required for the vehicle information from being sent out from the control unit to the transponder unit until being applied to the control unit from the receiver unit.

* * * * *